US012272327B2

(12) United States Patent
Huang et al.

(10) Patent No.: US 12,272,327 B2
(45) Date of Patent: Apr. 8, 2025

(54) METHOD FOR DRIVING DISPLAY PANEL, AND DISPLAY APPARATUS

(71) Applicants: Hefei BOE Display Technology Co., Ltd., Anhui (CN); BOE Technology Group Co., Ltd., Beijing (CN)

(72) Inventors: Yanting Huang, Beijing (CN); Liugang Zhou, Beijing (CN); Lei Guo, Beijing (CN); Jianwei Sun, Beijing (CN); Kai Chen, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/687,600

(22) PCT Filed: Nov. 2, 2021

(86) PCT No.: PCT/CN2021/128106
§ 371 (c)(1),
(2) Date: Feb. 28, 2024

(87) PCT Pub. No.: WO2023/077258
PCT Pub. Date: May 11, 2023

(65) Prior Publication Data

US 2024/0386859 A1 Nov. 21, 2024

(51) Int. Cl.
*G09G 3/36* (2006.01)
*G09G 3/20* (2006.01)

(52) U.S. Cl.
CPC ......... *G09G 3/3607* (2013.01); *G09G 3/2092* (2013.01); *G09G 3/3648* (2013.01); *G09G 2320/0242* (2013.01); *G09G 2340/16* (2013.01)

(58) Field of Classification Search
CPC .. G09G 3/3607; G09G 3/2092; G09G 3/3648; G09G 2320/0242; G09G 2340/16;
(Continued)

(56) References Cited

U.S. PATENT DOCUMENTS

2001/0026283 A1* 10/2001 Yoshida ............... G09G 3/2092 345/600
2005/0190610 A1* 9/2005 Furukawa ............ G09G 3/3611 365/189.05

(Continued)

FOREIGN PATENT DOCUMENTS

CN 1073694 A 6/1993
CN 102290036 B 1/2013

(Continued)

OTHER PUBLICATIONS

PCT/CN2021/128106 international search report dated Jul. 28, 2022.

*Primary Examiner* — Richard J Hong
(74) *Attorney, Agent, or Firm* — IPro, PLLC

(57) ABSTRACT

A driving method for a display panel (100), and a display apparatus. The method includes: acquiring display data of a current frame and display data of a previous frame (S10); determining whether the display data of the current frame is the same as the display data of the previous frame (S20); if not, converting a default gray scale voltage corresponding to at least one sub-pixel among default gray scale voltages corresponding to a default gray scale bit number carried by the display data of the current frame into a target gray scale voltage of a target gray scale bit number, and driving the display panel (100) to display (S30).

11 Claims, 7 Drawing Sheets

(58) Field of Classification Search
CPC ... G09G 3/3611; G09G 3/2055; G09G 3/3685
See application file for complete search history.

(56) References Cited

U.S. PATENT DOCUMENTS

| | | | | |
|---|---|---|---|---|
| 2010/0085387 | A1* | 4/2010 | Kim | G09G 3/3648 345/89 |
| 2010/0164923 | A1* | 7/2010 | Furukawa | G09G 3/2055 345/207 |
| 2010/0214309 | A1 | 8/2010 | Bae et al. | |
| 2019/0122627 | A1* | 4/2019 | Kim | G09G 3/3611 |
| 2021/0241674 | A1* | 8/2021 | Park | G09G 3/3685 |

FOREIGN PATENT DOCUMENTS

| | | | |
|---|---|---|---|
| CN | 103474042 | A | 12/2013 |
| CN | 104078016 | A | 10/2014 |
| CN | 105161047 | A | 12/2015 |
| CN | 112581896 | A | 3/2021 |
| CN | 113327535 | A | 8/2021 |

* cited by examiner

METHOD FOR DRIVING DISPLAY PANEL, AND DISPLAY APPARATUS

CROSS-REFERENCE TO RELATED APPLICATIONS

The disclosure is a National Stage of International Application No. PCT/CN2021/128106, filed on Nov. 2, 2021, which is hereby incorporated by reference in its entirety.

TECHNICAL FIELD

The disclosure relates to the field of display technology, and particularly relates to a method for driving a display panel and a display apparatus.

BACKGROUND

Displays, such as liquid crystal displays (LCDs), typically contain multiple pixels. Each pixel may include: a red sub-pixel, a green sub-pixel, and a blue sub-pixel. By controlling the display data corresponding to each sub-pixel, the display brightness of each sub-pixel is controlled, thereby mixing the required displayed colors to display a color image.

SUMMARY

Embodiments of the disclosure provide a method for driving a display panel, including: obtaining display data of a current frame and display data of a previous frame; determining whether the display data of the current frame and the display data of the previous frame are same; and in response to the display data of the current frame and the display data of the previous frame being not same, driving the display panel to display after converting a default grayscale voltage corresponding to at least one sub-pixel among default grayscale voltages of a default number of grayscale bits carried in the display data of the current frame into a target grayscale voltage of a target number of grayscale bits. Here, for a same sub-pixel, there is a default voltage difference between a default grayscale voltage corresponding to the sub-pixel and a voltage on a common electrode, there is a target voltage difference between a target grayscale voltage corresponding to the sub-pixel and the voltage on the common electrode, and the target voltage difference is greater than the default voltage difference. There is a target grayscale voltage difference between a target grayscale voltage corresponding to a maximum positive grayscale value of the target number of grayscale bits and a target grayscale voltage corresponding to a maximum negative grayscale value of the target number of grayscale bits, there is a default grayscale voltage difference between a default grayscale voltage corresponding to a maximum positive grayscale value of the default number of grayscale bits and a default grayscale voltage corresponding to a maximum negative grayscale value of the default number of grayscale bits, and the target grayscale voltage difference is greater than the default grayscale voltage difference.

In some embodiments, the target number of grayscale bits is greater than the default number of grayscale bits.

In some embodiments, the default grayscale voltage corresponding to the maximum negative grayscale value is taken as the target grayscale voltage corresponding to the maximum negative grayscale value, and the default grayscale voltage corresponding to the maximum positive grayscale value plus a set compensation voltage is the target grayscale voltage corresponding to the maximum positive grayscale value.

In some embodiments, the target grayscale voltage corresponding to the maximum positive grayscale value is 17.5V~20V.

In some embodiments, a method of determining the compensation voltage includes: increasing a grayscale voltage of a set display panel corresponding to the maximum positive grayscale voltage in a current adjustment, based on an initial grayscale voltage corresponding to the maximum positive grayscale value and an initial grayscale voltage corresponding to the maximum negative grayscale value, and according to a set step voltage value; determining a common voltage of the set display panel according to the initial grayscale voltage corresponding to the maximum negative grayscale value and a grayscale voltage corresponding to the maximum positive grayscale value after increasing; driving the set display panel to display according to the determined common voltage and the grayscale voltage corresponding to the maximum positive grayscale value after increasing; collecting a common voltage difference between a pixel electrode and the common electrode in the sub-pixel of the set display panel; determining whether the common voltage difference is within a set common voltage value range; in response to the common voltage difference being within the set common voltage value range, determining a difference between the grayscale voltage corresponding to the maximum positive grayscale value after increasing and the initial grayscale voltage corresponding to the maximum positive grayscale value as the compensation voltage; and in response to the common voltage difference being not within the set common voltage value range, entering a next adjustment.

In some embodiments, the driving of the display panel to display, after converting a default grayscale voltage corresponding to at least one sub-pixel among default grayscale voltages of a default number of grayscale bits carried in the display data of the current frame into a target grayscale voltage of a target number of grayscale bits, includes: for each sub-pixel, determining a grayscale difference between a grayscale value corresponding to the default grayscale voltage of the sub-pixel in the current frame and a grayscale value corresponding to a default grayscale voltage of the sub-pixel in the previous frame; and in response to the grayscale difference corresponding to at least one sub-pixel being not less than a grayscale difference threshold, driving the display panel to display after converting the default grayscale voltage of the sub-pixel into the target grayscale voltage.

In some embodiments, the converting of the default grayscale voltage of the sub-pixel into the target grayscale voltage includes: determining a grayscale value of the target number of grayscale bits corresponding to each grayscale value of the default number of grayscale bits carried in the display data of the current frame, according to the default number of grayscale bits, the target number of grayscale bits, and a plurality of pre-stored relationship tables of different numbers of grayscale bits; here, the relationship tables include: correspondence relationships between grayscale values of different number of grayscale bits; determining a target grayscale value from grayscale values corresponding to the target number of grayscale bits; here the target grayscale value is greater than the grayscale value of the target number of grayscale bits corresponding to the default grayscale voltage of the sub-pixel; and taking a grayscale voltage corresponding to the target grayscale value of the target number of grayscale bits as the target grayscale voltage of the sub-pixel.

In some embodiments, there is a set grayscale value between the target grayscale value and the grayscale value of the target number of grayscale bits corresponding to the default grayscale voltage of the sub-pixel.

Embodiments of the disclosure provide a display apparatus, including: a timing controller configured to obtain display data of a current frame and display data of a previous frame; determine whether the display data of the current frame and the display data of the previous frame are same; and in response to the display data of the current frame and the display data of the previous frame being not same, convert a default grayscale voltage corresponding to at least one sub-pixel among default grayscale voltages of a default number of grayscale bits carried in the display data of the current frame into a target grayscale voltage of a target number of grayscale bits; and a source drive circuit configured to receive the target grayscale voltage output from the timing controller, and drive the display panel to display according to the received target grayscale voltage. Here, for a same sub-pixel, there is a default voltage difference between a default grayscale voltage corresponding to the sub-pixel and a voltage on a common electrode, there is a target voltage difference between a target grayscale voltage corresponding to the sub-pixel and the voltage on the common electrode, and the target voltage difference is greater than the default voltage difference. There is a target grayscale voltage difference between a target grayscale voltage corresponding to a maximum positive grayscale value of the target number of grayscale bits and a target grayscale voltage corresponding to a maximum negative grayscale value of the target number of grayscale bits, there is a default grayscale voltage difference between a default grayscale voltage corresponding to a maximum positive grayscale value of the default number of grayscale bits and a default grayscale voltage corresponding to a maximum negative grayscale value of the default number of grayscale bits, and the target grayscale voltage difference is greater than the default grayscale voltage difference.

In some embodiments, the timing controller is further configured to: for each sub-pixel, determine a grayscale difference between a grayscale value corresponding to the default grayscale voltage of the sub-pixel in the current frame and a grayscale value corresponding to a default grayscale voltage of the sub-pixel in the previous frame; and in response to the grayscale difference corresponding to at least one sub-pixel being not less than a grayscale difference threshold, drive the display panel to display after converting the default grayscale voltage of the sub-pixel into the target grayscale voltage.

In some embodiments, the timing controller stores a plurality of relationship tables of different numbers of grayscale bits.

DETAILED DESCRIPTION

Figure 1:
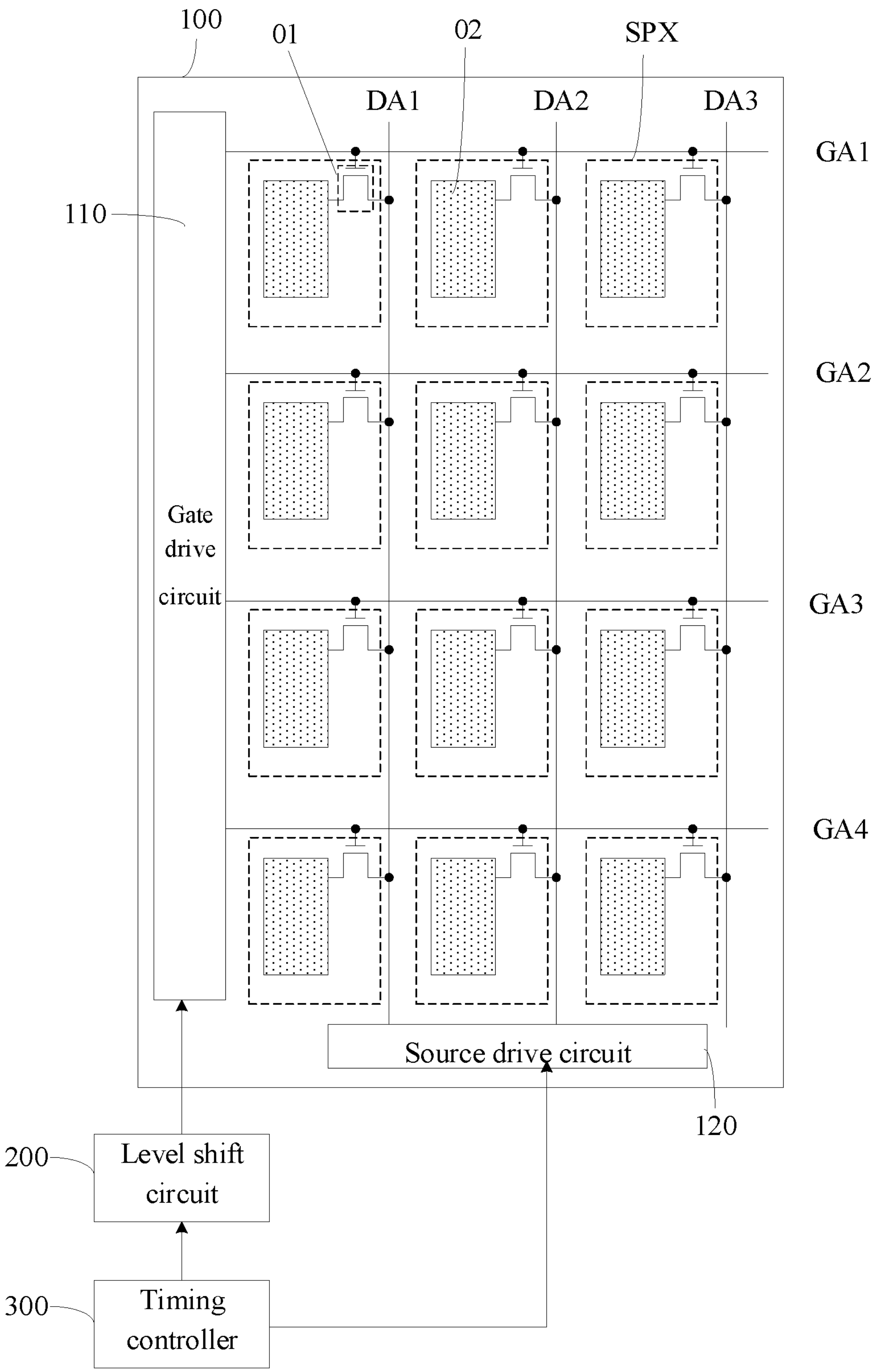
FIG. 1 is a schematic structural diagram of a display apparatus according to an embodiment of the disclosure.

In order to make objectives, technical solutions and advantages of the embodiments of the disclosure clearer, the technical solutions of the embodiments of the disclosure are described clearly and completely below with reference to the drawings of the embodiments of the disclosure. Apparently, the described embodiments are some embodiments, but not all of the embodiments of the disclosure. The embodiments in the disclosure and the features in the embodiments may be combined with each other without conflict. Based on the described embodiments of the disclosure, all other embodiments obtained by those of ordinary skill in the art without inventive efforts fall within the protection scope of the disclosure.

Unless otherwise indicated, the technical or scientific terms used in the disclosure shall have the usual meanings understood by a person of ordinary skill in the art to which the disclosure belongs. The words "first", "second" and the like used in the disclosure do not indicate any order, quantity or importance, but are only used to distinguish different components. The word "including" or "containing" and the like, means that an element or item preceding the word covers an element or item listed after the word and the equivalent thereof, without excluding other elements or items. The word "connection" or "coupling" and the like is not restricted to physical or mechanical connection, but may include electrical connection, whether direct or indirect.

It should be noted that sizes and shapes of all figures in the drawings do not reflect a true scale and are only intended to illustrate the contents of the disclosure. Same or similar reference signs indicate same or similar elements or elements with the same or similar function throughout the disclosure.

Referring to FIG. 1, a display apparatus may include a display panel 100, a level shift circuit 200 and a timing controller 300. The display panel 100 may include a plurality of pixel units arranged in an array, a plurality of gate lines (for example, GA1, GA2, GA3, GA4), a plurality of data lines (for example, DA1, DA2, DA3), a gate drive circuit 110 and a source drive circuit 120. The gate drive circuit 110 is coupled to the gate lines GA1, GA2, GA3, and GA4 respectively, and the source drive circuit 120 is coupled to the data lines DA1, DA2, and DA3 respectively. The timing controller 300 inputs a control signal to the level shift circuit 200, so that the level shift circuit 200 inputs a control signal to the gate drive circuit 110, thereby driving the gate lines GA1, GA2, GA3, and GA4. The timing controller 300 inputs a signal to the source drive circuit 120, so that the source drive circuit 120 provides grayscale voltages to the data lines, thereby charging the sub-pixels to implement the display function.

Exemplarily, each pixel unit includes a plurality of sub-pixels SPX. For example, the pixel unit can include a red sub-pixel, a green sub-pixel and a blue sub-pixel, to allow red, green, and blue colors to be mixed for color display. Alternatively, the pixel unit can include a red sub-pixel, a green sub-pixel, a blue sub-pixel and a white sub-pixel, to allow red, green, blue and white colors to be mixed for color display. Of course, in actual applications, the luminous color of the sub-pixels in the pixel unit can be designed and determined according to the actual application environment, which is not limited here.

Referring to FIG. 1, each sub-pixel includes a transistor 01 and a pixel electrode 02. Here, one of sub-pixel rows corresponds to one of gate lines, and one of sub-pixel columns corresponds to one of data lines. A gate of the transistor 01 is electrically connected with a corresponding gate line, a source of the transistor 01 is electrically connected with a corresponding data line, and a drain of the transistor 01 is electrically connected with the pixel electrode 02. It should be noted that the pixel array structure of the disclosure can be a double gate structure, that is, two gate lines are arranged between two adjacent sub-pixel rows. This arrangement can reduce the number of data lines by half, that is, there is a data line between two adjacent columns of some of pixels, and there is no data line between two adjacent columns of others of pixels. The specific pixel arrangement structure, and the layout of the data lines and the scan lines are not limited here.

Grayscale generally refers to one of several brightness levels ranging from the weakest brightness and the strongest brightness, which facilitates screen brightness control. For example, a displayed image consists of three colors which are red, green, and blue. Each color can show different brightness levels, and the combination of red, green, and blue with different brightness levels can form different colors. For example, the number of grayscale bits of the liquid crystal display (LCD) panel is 6, and the three colors of red, green and blue each have 64 (that is, $2^6$) grayscales which range from 0 to 63 respectively. The number of grayscale bits of the LCD panel is 8, and the three colors of red, green and blue each have 256 (that is, $2^8$) grayscales which range from 0 to 255 respectively. The number of grayscale bits of the LCD panel is 10, and the three colors of red, green and blue each have 1024 (that is, $2^{10}$) grayscales which range from 0 to 1023 respectively. The number of grayscale bits of the LCD panel is 12, and the three colors of red, green and blue each have 4096 (that is, $2^{12}$) grayscales which range from 0 to 4093 respectively.

It should be noted that the display panel in the embodiment of the disclosure may be a LCD panel. Exemplarily, a LCD panel generally includes an upper substrate and a lower substrate for cell alignment, and liquid crystal molecules between the upper substrate and the lower substrate. When displaying an image, due to the voltage difference between the grayscale voltage on the pixel electrode of each sub-pixel and the voltage on the common electrode, an electric field can be formed, thereby causing the liquid crystal molecules to rotate under the action of the electric field. Since electric fields of different strengths cause different degrees of rotation of liquid crystal molecules, the transmittance of the sub-pixels is different, so that the sub-pixels can present the brightness of different grayscales, thereby realizing screen display.

In the following description, the display panel in the embodiments of the disclosure is a liquid crystal display panel, and the pixel unit includes a red sub-pixel, a green sub-pixel, and a blue sub-pixel, which are taken as examples for illustration. However, readers should know that colors of the sub-pixels included in the liquid crystal display panel are not limited to this.

Since liquid crystal molecules have a viscous effect, there will be a time process for the liquid crystal molecules to rotate to an expected state, which is the response time. Here, the faster the liquid crystal molecules rotate, the shorter the response time. The slower the liquid crystal molecules rotate, the longer the response time. As the resolution of the display panel becomes higher and higher, the charging time of the sub-pixels becomes shorter and shorter, resulting in an insufficient charging rate of the sub-pixels. This further causes the liquid crystal molecules to rotate relatively slowly, resulting in a relatively long response time of the liquid crystal molecules and a ghosting problem when displaying images.

Figure 2:
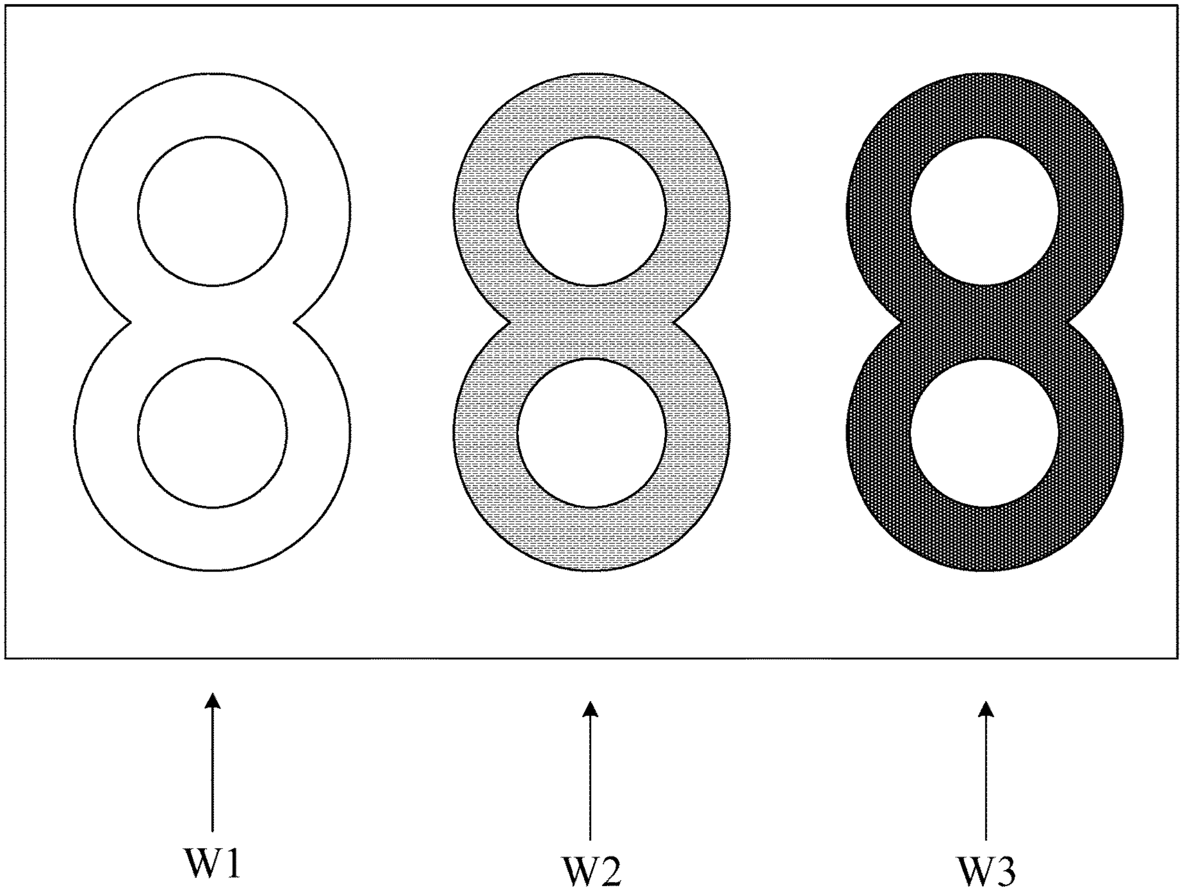
FIG. 2 is a schematic diagram of an image displayed on a display panel according to an embodiment of the disclosure.

The ghosting problem occurs especially when the sub-pixel is provided with a voltage converted from a low grayscale to a high grayscale. As shown in FIG. 2, taking a display panel with a 6-bit grayscale as an example, when the display panel presents a test image with a background having a grayscale of 255 and a digit 8 having a grayscale of 0, "W1" indicates a position where the digit 8 is in a first frame of the test image, "W2" indicates a position where the digit 8 is in a second frame of the test image, and "W3" indicates a position where the digit 8 is in a third frame of the test image. As can be seen from FIG. 2, in the second frame, the digit 8 corresponding to W1 does not immediately turn white, and there is a ghosting image. In the third frame, the digit 8 corresponding to W2 does not immediately turn white, and there is also a ghosting image.

Figure 3:
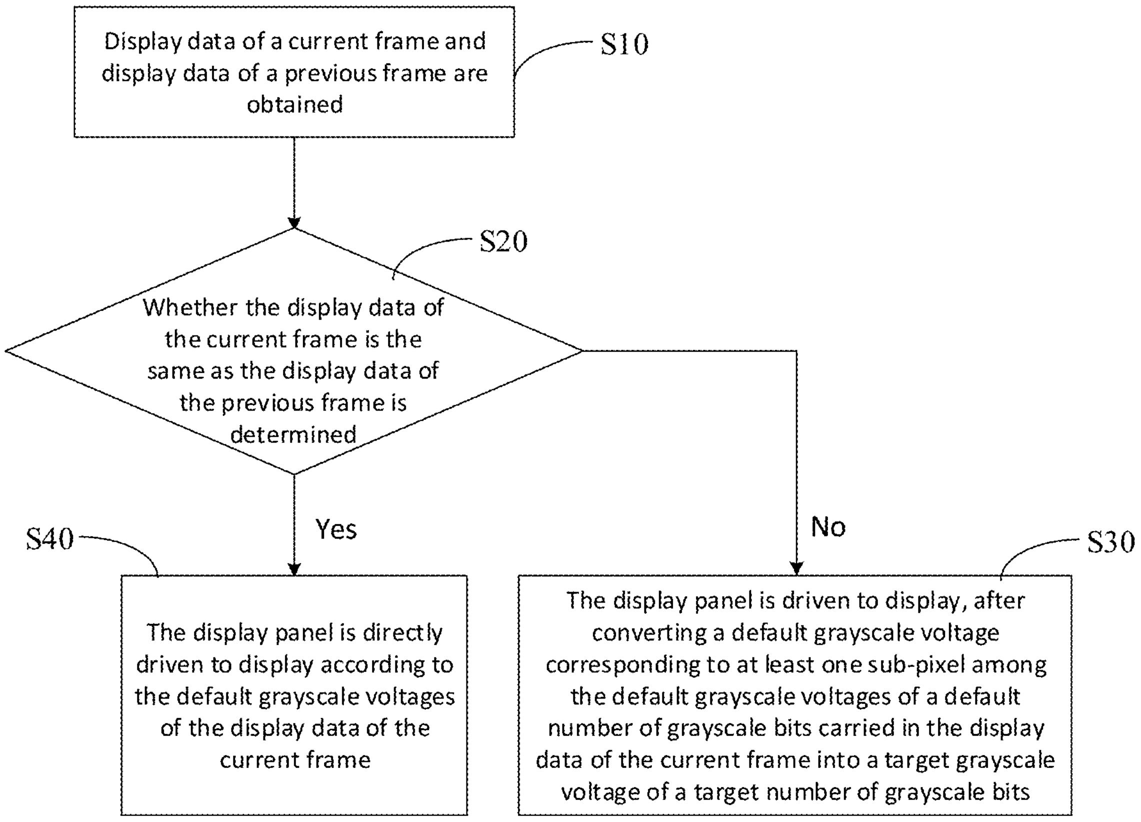
FIG. 3 is a schematic flow chart of a driving method according to an embodiment of the disclosure.

In order to improve the response speed and reduce the response time of liquid crystal molecules, embodiments of the disclosure provide a driving method for a display panel, as shown in FIG. 3, which may include the following steps.

S10: display data of a current frame and display data of a previous frame are obtained.

Figure 4A:
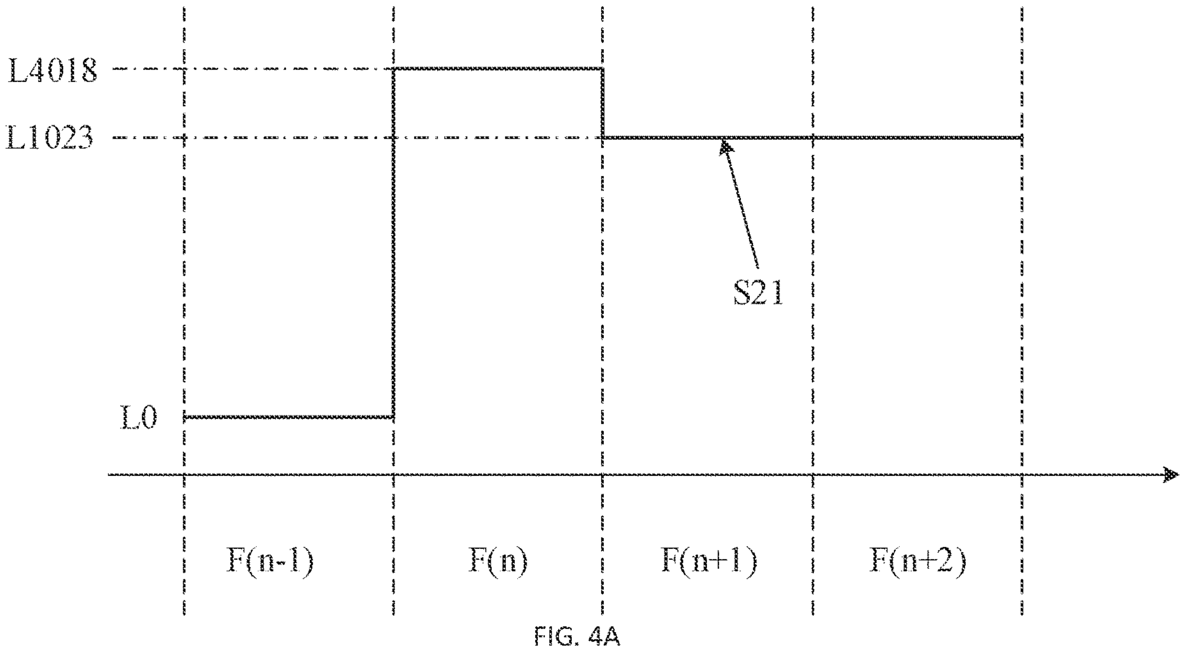
FIG. 4A is a schematic diagram illustrating grayscales corresponding to different display frames according to an embodiment of the disclosure.

For example, as shown in FIG. 4A, for a video, images can be displayed through consecutive frames. Here, taking the $(n-1)^{th}$ frame F(n−1) to $(n+2)^{th}$ frame F(n+2) of the video as an example, when the image of the $n^{th}$ frame F(n) will be displayed, the $n^{th}$ frame F(n) is regarded as the current frame, and the $(n-1)^{th}$ frame F(n−1) is regarded as the previous frame. In this way, the display data of the $n^{th}$ frame F(n) and the display data of the $(n-1)^{th}$ frame F(n−1) can be obtained. When the image of the $(n+1)^{th}$ frame F(n+1) will be displayed, the $(n+1)^{th}$ frame F(n+1) can be regarded as the current frame, and the $n^{th}$ frame F(n) can be regarded as the previous frame, so that the display data of the $n^{th}$ frame F(n) and the display data of the $(n+1)^{th}$ frame F(n+1) can be displayed. The rest can be done in a similar manner and will not be described in detail here.

It should be noted that the obtained display data of the current frame and the display data of the previous frame are initial display data carrying a default number of grayscale bits, and the carried default number of grayscale bits has not been converted into a target number of grayscale bits.

S20: whether the display data of the current frame is the same as the display data of the previous frame is determined.

For example, when the image of the $n^{th}$ frame F(n) is to be displayed, for a same sub-pixel, the display data of the sub-pixel in the $n^{th}$ frame F(n) and the display data of the sub-pixel in the (n−1)$^{th}$ frame F(n−1) may be compared, until the display data of all sub-pixels have been compared.

If for each sub-pixel, the display data of the n$^{th}$ frame F(n) and the display data of the (n−1)$^{th}$ frame F(n−1) corresponding to the same sub-pixel are same, then it means that the image to be displayed in the n$^{th}$ frame F(n) is the same as the image already displayed in the (n−1)$^{th}$ frame F(n−1). That is, the images displayed in the n$^{th}$ frame F(n) and the (n−1)$^{th}$ frame F(n−1) are not switched, which means that the image displayed is a static image. In this case, a corresponding grayscale of the sub-pixel does not change, so there is no need to convert the grayscale voltage corresponding to the number of grayscale bits. Then step S40 can be performed to directly drive the display panel to display according to the default grayscale voltage of the display data of the current frame.

If for all sub-pixels, the display data of the n$^{th}$ frame F(n) and the display data of the (n-1)th frame F(n−1) corresponding to some sub-pixels are same, and the display data of the n$^{t}$h frame F(n) and the display data of the (n−1)$^{th}$ frame F(n−1) corresponding to remaining sub-pixels are different; or the display data of the n$^{th}$ frame F(n) and the display data of the (n−1)$^{t}$h frame F(n−1) corresponding to all the sub-pixels are different, then it means that the image to be displayed in the n$^{th}$ frame F(n) is different from the image that has been displayed in the (n-1)th frame F(n−1). In other words, the images displayed in the n$^{th}$ frame F(n) and the (n−1)$^{th}$ frame F(n−1) are changed, that is, dynamic images are displayed. In this case, the grayscales corresponding to the remaining sub-pixels change, so that the grayscale voltage corresponding to the number of grayscale bits can be changed. Then step S30 can be performed.

When the image of the (n+1)$^{th}$ frame F(n+1) is to be displayed, the display data of the (n+1)$^{th}$ frame F(n+1) and the display data of the n$^{th}$ frame F(n) corresponding to a same sub-pixel are compared, until the display data of all sub-pixels have been compared. If for each sub-pixel, the display data of the n$^{th}$ frame F(n) and the display data of the (n+1)$^{th}$ frame F(n+1) corresponding to the same sub-pixel are same, then it means that the image to be displayed in the n$^{th}$ frame F(n) is the same as the image already displayed in the (n+1)$^{th}$ frame F(n+1). That is, the images displayed in the n$^{th}$ frame F(n) and the (n+1)$^{th}$ frame F(n+1) are not changed, meaning that the image displayed is a static image. In this case, the corresponding grayscale of the sub-pixel does not change, so there is no need to convert the grayscale voltage corresponding to the number of grayscale bits. Then step S40 can be performed to directly drive the display panel to display according to the default grayscale voltage of the display data of the current frame.

If for all sub-pixels, the display data of the n$^{th}$ frame F(n) and the display data of the (n+1)$^{th}$ frame F(n+1) corresponding to some sub-pixels are same, and the display data of the n$^{t}$h frame F(n) and the display data of the (n+1)$^{th}$ frame F(n+1) corresponding to remaining sub-pixels are different; or the display data of the n$^{th}$ frame F(n) and the display data of the (n+1)$^{th}$ frame F(n+1) corresponding to all sub-pixels are different, then it means that the image to be displayed in the n$^{th}$ frame F(n) is different from the image that has been displayed in the (n+1)$^{th}$ frame F(n+1). That is, the images displayed in the n$^{th}$ frame F(n) and the (n+1)$^{th}$ frame F(n+1) are changed, meaning that dynamic images are displayed. In this case, the grayscales corresponding to the remaining sub-pixels are changed, so that the grayscale voltage corresponding to the number of grayscale bits can be converted. Then step S30 can be performed.

When the image of the (n+2)$^{th}$ frame F(n+2) is to be displayed, the display data of the (n+1)$^{th}$ frame F(n+1) and the display data of the (n+2)$^{th}$ frame F(n+2) corresponding to the same sub-pixel can be compared, until the display data of all sub-pixels have been compared. If for each sub-pixel, the display data of the (n+2)$^{th}$ frame F(n+2) and the display data of the (n+1)$^{th}$ frame F(n+1) corresponding to the same sub-pixel are the same, then it means that the image to be displayed in the (n+2)$^{th}$ frame F(n+2) is the same as the image already displayed in the (n+1)$^{th}$ frame F(n+1). That is, the images displayed in the (n+2)$^{th}$ frame F(n+2) and the (n+1)$^{th}$ frame F(n+1) are not changed, meaning that a static image is displayed. In this case, the grayscales corresponding to the sub-pixels does not change, so there is no need to convert the grayscale voltage corresponding to the number grayscale bits. Then step S40 can be performed to directly drive the display panel to display according to the default grayscale voltage of the display data of the current frame.

If for all sub-pixels, the display data of the (n+2)$^{th}$ frame F(n+2) and the display data of the (n+1)$^{th}$ frame F(n+1) corresponding to some sub-pixels are same, and the display data of the (n+2)$^{th}$ frame F(n+2) and the display data of the (n+1)$^{th}$ frame F(n+1) corresponding to remaining sub-pixels are different; or the display data of the (n+2)$^{th}$ frame F(n+2) and the display data of the (n+1)$^{th}$ frame F(n+1) corresponding to all sub-pixels are different, then it means that the image to be displayed in the (n+2)$^{th}$ frame F(n+2) is different from the image that has been displayed in the (n+1)$^{th}$ frame F(n+1). That is, the images displayed in the (n+2)$^{th}$ frame F(n+2) and the (n+1)$^{th}$ frame F(n+1) are changed, meaning that dynamic images are displayed. In this case, the grayscales corresponding to the remaining sub-pixels are changed, so that the grayscale voltage corresponding to the number of grayscale bits can be converted. Then step S30 can be performed.

The remaining frames can be judged according to the above method to determine whether the display panel needs to be driven for display according to step S30 or step S40.

S30: the display panel is driven to display, after converting a default grayscale voltage corresponding to at least one sub-pixel among the default grayscale voltages of a default number of grayscale bits carried in the display data of the current frame into a target grayscale voltage of a target number of grayscale bits.

S40: the display panel is directly driven to display according to the default grayscale voltages of the display data of the current frame.

The above driving method provided by the embodiments of the disclosure can perform analysis on the display data of the current frame and the display data of the previous frame by obtaining the display data of the current frame and the display data of the previous frame to determine whether the display data of the current frame is the same as the display data of the previous frame. When it is determined that the display data of the current frame and the display data of the previous frame are not the same, the default grayscale voltage of at least one sub-pixel may be converted into a target grayscale voltage of a target number of grayscale bits. For a same sub-pixel, since the target voltage difference corresponding to the sub-pixel is greater than the default voltage difference, the intensity of the electric field generated by the target voltage difference can be greater than the intensity of the electric field generated by the default voltage difference. In a same charging time period, a stronger electric field can drive the liquid crystal molecules to rotate faster, so that the liquid crystal molecules can quickly orientate with the target rotation angle, thus improving the response rate of the liquid crystal molecules.

In the embodiment of the disclosure, the timing controller 300 can obtain the display data of the current frame and the display data of the previous frame; determine whether the display data of the current frame and the display data of the previous frame are the same; and when it is determined that the display data of the current frame is not the same as the display date of the previous frame, convert the default grayscale voltage corresponding to at least one sub-pixel among the default grayscale voltages of a default number of grayscale bits carried in the display data of the current frame into a target grayscale voltage of a target number of grayscale bits to output. The source drive circuit can receive the target grayscale voltage output from the timing controller, and drive the display panel to display in the current frame according to the received target grayscale voltage. When it is determined that the display data of the current frame is the same as the display data of the previous frame, the default grayscale voltage of the display data of the current frame can be directly output. The source drive circuit can receive the default grayscale voltage output from the timing controller, and drive the display panel to display in the current frame based on the received default grayscale voltage.

In the embodiment of the disclosure, the default number of grayscale bits can be selected from 6-bit, 8-bit, 10-bit, 12-bit, etc. The target number of grayscale bits can be selected from 6-bit, 8-bit, 10-bit, 12-bit, etc. For example, because the higher the number of grayscale bits, there will be more different brightness levels from the darkest to the brightest, and the finer the image effect that can be presented. Based on this, the target number of grayscale bits can be greater than the default number of grayscale bits, to allow for the finer display of the panel. For example, the default number of grayscale bits is 6-bit, and the target number of grayscale bits is 8-bit, 10-bit, or 12-bit. Or, the default number of grayscale bits is 8-bit, and the target number of grayscale bits is 10-bit or 12-bit. Or, the default number of grayscale bits is 10-bit, and the target number of grayscale bits is 12-bit. It should be noted that in the embodiment of the disclosure, the display data of the current frame carries a resolution of the current frame, and the resolution corresponds to one number of grayscale bits which is the default number of grayscale bits in the embodiment of the disclosure.

For example, when the grayscale voltage input into the pixel electrode of a sub-pixel is greater than the voltage on the common electrode, the polarity of the sub-pixel can be positive, and the grayscale value corresponding to the grayscale voltage can be regarded as a positive grayscale value. When the grayscale voltage input into the pixel electrode of the sub-pixel is less than the voltage on the common electrode, the polarity of the sub-pixel can be negative, and the grayscale value corresponding to the grayscale voltage can be regarded as a negative grayscale value. For example, the voltage on the common electrode can be 8.3V. Taking a sub-pixel as an example, if a grayscale voltage of 8.3V-16V is input into the pixel electrode of the sub-pixel, the liquid crystal molecules at the sub-pixel can be made to have a positive polarity, and then the grayscale voltage of 8.3V-16V corresponds to the positive grayscale value. If a grayscale voltage of 0.6V-8.3V is input into the pixel electrode of the sub-pixel, the liquid crystal molecules at the sub-pixel can be made to have a negative polarity, and then the grayscale voltage of 0.6V-8.3V corresponds to a negative grayscale value. For example, taking the 8-bit grayscale of 0 to 255 as an example, the positive grayscale values range from 0 to +255, and the negative grayscale values range from 0 to −255. If a grayscale voltage of 16V is input into the pixel electrode of the sub-pixel, the sub-pixel can correspond to a brightness of a maximum positive grayscale value of +255. If a grayscale voltage of 0.6V is input into the pixel electrode of the sub-pixel, the sub-pixel can correspond to a brightness of a maximum negative grayscale value of −255. That is, +255 is the maximum value among positive grayscale values, and −255 is the maximum value among negative grayscale values. Similarly, for 10-bit grayscale, the positive grayscale values ranges from 0 to +1023, and the negative grayscale values range from 0 to −1023. For 12-bit grayscale, the positive grayscale values range from 0 to +4095, and the negative grayscale values range from 0 to −4095.

In the embodiment of the disclosure, for the default number of grayscale bits, there is a default grayscale voltage difference ($V_{+mrmax}-V_{-mrmax}$) between a default grayscale voltage $V_{+mrmax}$ corresponding to a maximum positive grayscale value and a default grayscale voltage $V_{-mrmax}$ corresponding to a maximum negative grayscale value. For a target number of grayscale bits, there is a target grayscale voltage difference ($V_{+mbmax}-V_{-mbmax}$) between a target grayscale voltage $V_{+mbmax}$ corresponding to a maximum positive grayscale value and a target grayscale voltage $V_{-mbmax}$ corresponding to a maximum negative grayscale value. Here, the target grayscale voltage difference ($V_{+mbmax}-V_{-mbmax}$) is greater than the default grayscale voltage difference ($V_{+mrmax}-V_{-mrmax}$), that is, $(V_{+mbmax}-V_{-mbmax})>(V_{+mrmax}-V_{-mrmax})$. For example, the default number of grayscale bits as 8-bit and the target number of grayscale bits as 10-bit are taken for an example. For 8-bit grayscale, the default grayscale voltage corresponding to the maximum positive grayscale value is the default grayscale voltage $V_{+255}$ corresponding to the grayscale of +255, and the default grayscale voltage corresponding to the maximum negative grayscale value is the default grayscale voltage $V_{-255}$ corresponding to the grayscale of −255, herein $V_{+255}>V_{-255}$; and then the default grayscale voltage difference is ($V_{+255}-V_{-255}$). For 10-bit grayscale, the target grayscale voltage corresponding to the maximum positive grayscale value is the target grayscale voltage $V_{+1023}$ corresponding to the grayscale of +1023, and the target grayscale voltage corresponding to the maximum negative grayscale value is the target grayscale voltage $V_{-1023}$ corresponding to the grayscale of −1023, herein $V_{+255}>$ $V_{-255}$; and then the target grayscale voltage difference is ($V_{+1023}-V_{-1023}$). Then ($V_{+1023}-V_{-1023}$) can be greater than ($V_{+255}-V_{-255}$).

In the embodiment of the disclosure, the default grayscale voltage corresponding to the maximum negative grayscale value may be used as the target grayscale voltage corresponding to the maximum negative grayscale value. And, the default grayscale voltage corresponding to the maximum positive grayscale value plus a set compensation voltage can be used as the target grayscale voltage corresponding to the maximum positive grayscale value. For example, if the default grayscale voltage corresponding to the maximum negative grayscale value is 0.6V, the target grayscale voltage corresponding to the maximum negative grayscale value may also be 0.6V. If the default grayscale voltage corresponding to the maximum positive grayscale value is 16V and the set compensation voltage is 1.5V-4V, then the target grayscale voltage corresponding to the maximum positive grayscale value can be 17.5V-20V. For example, the default grayscale voltage corresponding to the maximum positive grayscale value being 16V is taken as an example, if the set compensation voltage is 1.5V, the target grayscale voltage corresponding to the maximum positive grayscale value can be 17.5V. If the set compensation voltage is 2.6V, the target grayscale voltage corresponding to the maximum positive grayscale value can be 18.6V. If the set compensation voltage is 4V, the target grayscale voltage corresponding to the maximum positive grayscale value can be 20V.

It should be noted that using the default grayscale voltage corresponding to the maximum negative grayscale value as the target grayscale voltage corresponding to the maximum negative grayscale value is based on the performance of the components in the source drive circuit. If the performance of the components in the source drive circuit allows, a set negative compensation voltage can be subtracted from the default grayscale voltage corresponding to the maximum negative grayscale value to get the target grayscale voltage corresponding to the maximum negative grayscale value.

Figure 5:
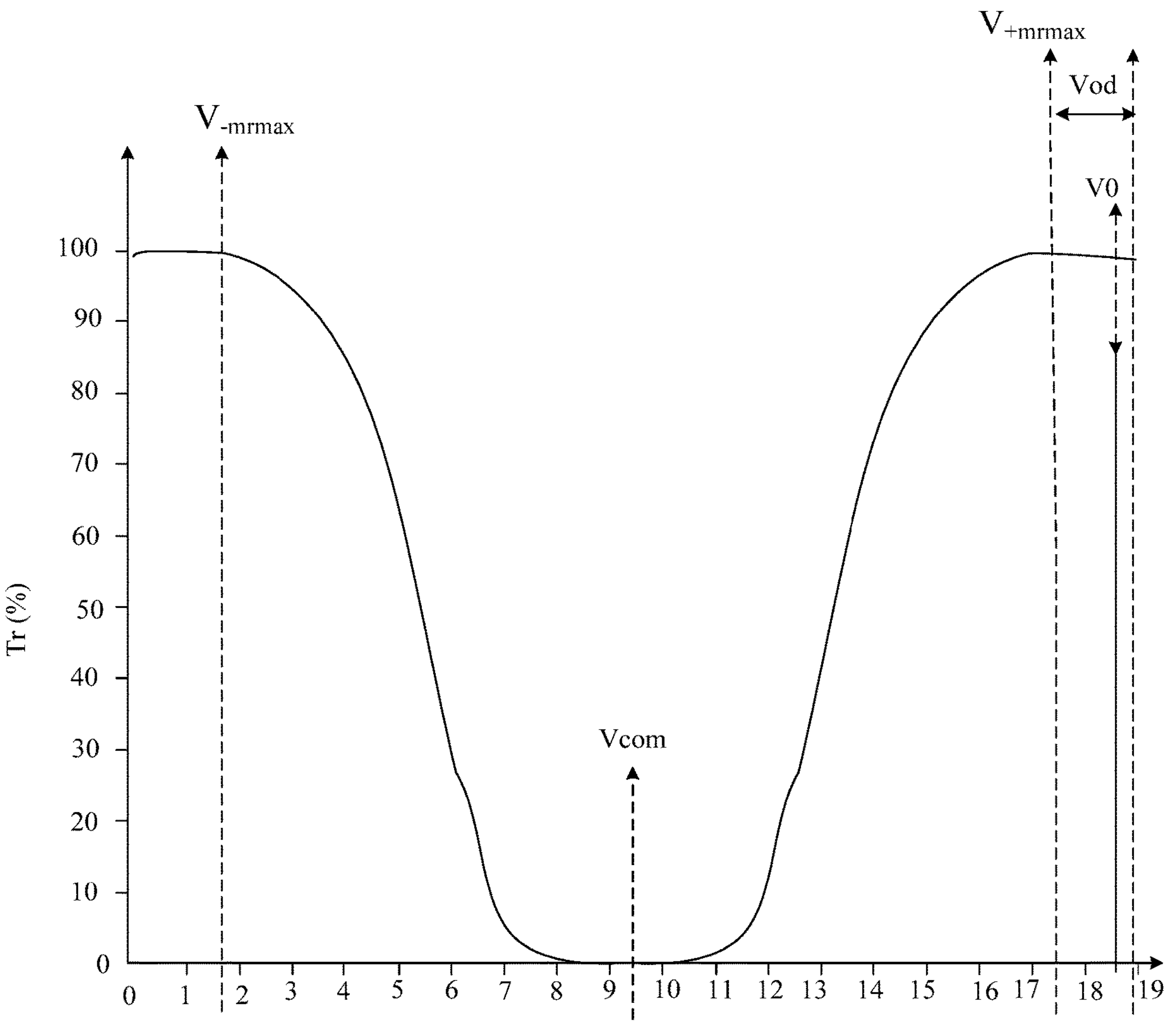
FIG. 5 is a schematic diagram of a curve showing a relation between voltages and transmittances according to an embodiment of the disclosure.

The transmittance of the display panel is considered, referring to FIG. 5, which shows a curve illustrating a relation between transmittances and grayscale voltages corresponding to grayscales. The abscissa represents the voltage, and the ordinate represents the transmittance. Here, the voltage on the curve that is smaller than the voltage Vcom on the common electrode is the grayscale voltage corresponding to the negative grayscale value, and the voltage on the curve that is greater than the voltage Vcom on the common electrode is the grayscale voltage corresponding to the positive grayscale value. $V_{-mrmax}$ represents the default grayscale voltage corresponding to the maximum negative grayscale value. $V_{+mrmax}$ represents the default grayscale voltage corresponding to the maximum positive grayscale value. A voltage in an interval Vod can be obtained by increasing a voltage starting from $V_{+mrmax}$ in sequence, the obtained voltage is input into the sub-pixel, and the display requirement can be met (for example, the error tolerance range is met) between a obtained transmittance and a transmittance when $V_{+mrmax}$ is applied; and then the voltage in the interval Vod can be used as the grayscale voltage corresponding to the maximum positive grayscale value. However, as can be seen from FIG. 5, in the interval Vod, the transmittance will also decrease to some extent. In order to make the transmittance decrease as less as possible, and to make the grayscale voltage corresponding to the maximum positive grayscale value be selected more appropriately, 18.6V corresponding to VO can be used as the grayscale voltage corresponding to the maximum positive grayscale value. Moreover, based on the rated voltage and rated current of the components in the source drive circuit, using 18.6V as the grayscale voltage corresponding to the maximum positive grayscale value can prevent the power consumption of the source drive circuit from increasing too much. As a result, the grayscale voltage corresponding to the maximum positive grayscale value can be obtained within the limit allowed by the source drive circuit.

Generally, the voltage on the common electrode may be an intermediate value between the grayscale voltage corresponding to the maximum positive grayscale value and the grayscale voltage corresponding to the maximum negative grayscale value. For example, when the grayscale voltage corresponding to the maximum positive grayscale value is 16V and the grayscale voltage corresponding to the maximum negative grayscale value is 0.6V, the voltage on the common electrode can be (16V+0.6V)/2=8.3V. In the embodiment of the disclosure, since the target grayscale voltage difference is greater than the default grayscale voltage difference, the voltage on the common electrode corresponding to the default grayscale voltage is different from the voltage on the common electrode corresponding to the target grayscale voltage. For example, the voltage $Vcom_{mr}$ on the common electrode corresponding to the default grayscale voltage can be: $Vcom_{mr}=(V_{+mrmax}+V_{-mrmax})/2$. The voltage $Vcom_{mb}$ on the common electrode corresponding to the target grayscale voltage can be: $Vcom_{mb}=(V_{+mbmax}+V_{-mbmax})/2$.

In the embodiment of the disclosure, for the same sub-pixel, there is a default voltage difference between the default grayscale voltage corresponding to the sub-pixel and the voltage Vcom on the common electrode, there is a target voltage difference between the target grayscale voltage corresponding to the sub-pixel and the voltage on the common electrode, and the target voltage difference is greater than the default voltage difference. For example, for the same sub-pixel, there is a default voltage difference $(V_{+mr}-Vcom_{mr})$ between the default grayscale voltage $V_{+mr}$ of the sub-pixel corresponding to the positive grayscale and the voltage $Vcom_{mr}$ on the common electrode, and there is a target voltage difference $(V_{+mb}-Vcom_{mb})$ between the target grayscale voltage $V_{+mb}$ of the sub-pixel corresponding to the positive grayscale and the voltage $Vcom_{mb}$ on the common electrode, wherein $(V_{+mb}-Vcom_{mb})>(V_{+mr}-Vcom_{mr})$. For example, for the same sub-pixel, there is a default voltage difference $(Vcom_{mr}-V_{-mr})$ between the default grayscale voltage $V_{-mr}$ of the sub-pixel corresponding to the negative grayscale and the voltage $Vcom_{mr}$ on the common electrode, and there is a target voltage difference $(Vcom_{mb}-V_{-mb})$ between the target grayscale voltage $V_{-mb}$ of the sub-pixel corresponding to the negative grayscale and the voltage $Vcom_{mb}$ on the common electrode, wherein $(Vcom_{mb}-V_{-mb})>(Vcom_{mr}-V_{-mr})$.

For example, the compensation voltage may be obtained by testing before the display panel leaves the factory. After obtaining the compensation voltage, the compensation voltage can be stored in the timing controller, so that it can be used directly according to the method in the disclosure after the display panel leaves the factory.

Figure 6:
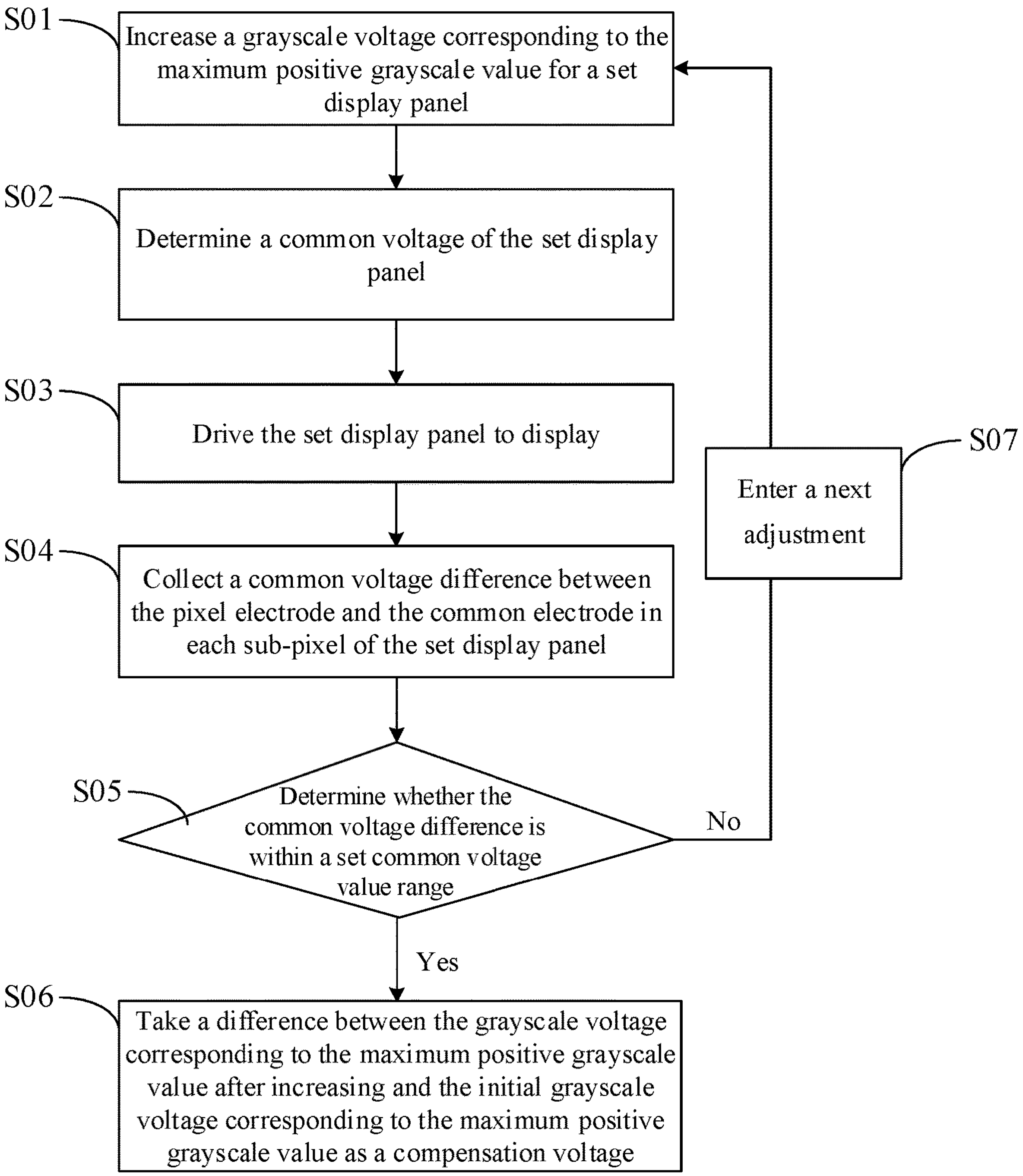
FIG. 6 is a schematic flow chart of a method for determining a compensation voltage according to an embodiment of the disclosure.

In the embodiment of the disclosure, the method for determining the compensation voltage, as shown in FIG. 6, may include the following steps.

S01: based on an initial grayscale voltage corresponding to a maximum positive grayscale value and an initial grayscale voltage corresponding to a maximum negative grayscale value, and according to a set step voltage value, a grayscale voltage corresponding to the maximum positive grayscale value for a set display panel is increased in a current adjustment.

For example, the set step voltage value can be 0.1V, 0.2V, 0.5V, etc., which can be determined according to the needs of the actual application, and is not limited here.

Taking the initial grayscale voltage corresponding to the maximum negative grayscale value as 0.6V, the initial grayscale voltage corresponding to the maximum positive grayscale value as 16V, and the set step voltage value as 0.1V for an example, in the previous adjustment, the grayscale voltage corresponding to the maximum positive grayscale value is 16.4V; and in the current adjustment, 0.1V can be added to 16.4V to get 16.5V. Then, the voltage of 16.5V is used as a grayscale voltage corresponding to the maximum positive grayscale value after increasing in the current adjustment.

S02: a common voltage of the set display panel is determined according to the initial grayscale voltage corresponding to the maximum negative grayscale value and a grayscale voltage corresponding to the maximum positive grayscale value after increasing.

For example, the voltage on the common electrode may be an intermediate value between the grayscale voltage corresponding to the maximum positive grayscale value and the grayscale voltage corresponding to the maximum negative grayscale value. For example, when the grayscale voltage corresponding to the maximum positive grayscale value is 16.5V and the grayscale voltage corresponding to the maximum negative grayscale value is 0.6V, the voltage on the common electrode can be (16.5V+0.6V)/2=8.55V.

S03: the set display panel is driven to display according to the determined common voltage and the grayscale voltage corresponding to the maximum positive grayscale value after increasing.

It should be noted that due to the different specifications of display panels of different models, after display panels of a certain model are prepared, one, two, three or more display panels can be selected from the display panels of this model before leaving the factory to serve as set display panels.

For example, a voltage of 8.55V is input into the common electrode and a voltage of 16.5V is input into the pixel electrode of each sub-pixel in the set display panel to drive the set display panel to display.

S04: a common voltage difference between the pixel electrode and the common electrode in each sub-pixel of the set display panel is collected.

For example, after inputting the voltage of 8.55V to the common electrode and inputting the voltage of 16.5V to the pixel electrode of each sub-pixel in the display panel, the common voltage difference between the pixel electrode and the common electrode can be collected through a voltage collection device.

S05: whether the common voltage difference is within a set common voltage value range is determined.

It should be noted that the set common voltage value range can be an error tolerance range. Of course, in actual applications, since display panels of different specifications have different requirements, the set common voltage value range can be determined according to the needs of the actual application, which is not limited here.

For example, the collected common voltage difference between the pixel electrode and the common electrode via the voltage collection device is compared with the set common voltage value range to determine whether the voltage difference is within the set common voltage value range. If yes, it means that the voltage difference is within the set common voltage value range, then step S06 can be performed. Otherwise, it means that the voltage difference is not within the set common voltage value range, then step S07 can be performed.

S06: a difference between the grayscale voltage corresponding to the maximum positive grayscale value after increasing and the initial grayscale voltage corresponding to the maximum positive grayscale value is taken as a compensation voltage.

For example, since the initial grayscale voltage corresponding to the maximum positive grayscale value is 16V, and the grayscale voltage corresponding to the maximum positive grayscale value after increasing is 16.5V, then 0.5V can be stored as the compensation voltage.

S07: a next adjustment is entered.

For example, in the next adjustment, 0.1V can be added to 16.5V to get 16.6V, and then the voltage of 16.6V is taken as the grayscale voltage corresponding to the maximum positive grayscale value after increasing in the next adjustment. Further, the steps after the step S01 are executed, and the details will not be described again here.

In the embodiment of the disclosure, the step S30 of driving the display panel to display, after converting a default grayscale voltage corresponding to at least one sub-pixel among the default grayscale voltages of a default number of grayscale bits carried in the display data of the current frame into a target grayscale voltage of a target number of grayscale bits may include: for each sub-pixel, determining a grayscale difference between the grayscale value corresponding to the default grayscale voltage of the sub-pixel in the current frame and the grayscale value corresponding to the default grayscale voltage of the sub-pixel in the previous frame corresponding to the sub-pixel; and when the grayscale difference corresponding to at least one sub-pixel is not less than a grayscale difference threshold, driving the display panel to display after converting the default grayscale voltage of the sub-pixel into the target grayscale voltage. For example, taking the image of the $n^{th}$ frame F(n) to be displayed as an example, according to the display data of the $n^{th}$ frame F(n), the default grayscale voltage corresponding to each sub-pixel in the $n^{th}$ frame F(n) and the grayscale value corresponding to the default grayscale voltage can be obtained. And, according to the display data of the $(n-1)^{th}$ frame F(n−1), the default grayscale voltage corresponding to each sub-pixel in the $(n-1)^{th}$ frame F(n−1) and the grayscale value corresponding to the default grayscale voltage are obtained. Taking a sub-pixel as an example, a grayscale difference between the grayscale value corresponding to the sub-pixel in the $n^{th}$ frame F(n) and the grayscale value corresponding to the sub-pixel in the $(n+1)^{th}$ frame F(n+1) is obtained. The grayscale differences corresponding to the remaining sub-pixels can be obtained in a similar manner, which will not be described in detail here. After determining the grayscale difference corresponding to each sub-pixel, these grayscale differences can be compared with the grayscale difference threshold. If there is a grayscale difference corresponding to a sub-pixel that is not less than the grayscale difference threshold, it means that the grayscale jump is large and there may be a ghosting problem. Based on this, the default grayscale voltage of each sub-pixel in the $n^{th}$ frame F(n) can be converted into a target grayscale voltage, and then the display panel can be driven to display. If there is no grayscale difference corresponding to a sub-pixel that is not less than the grayscale difference threshold, that is, the grayscale differences corresponding to all sub-pixels are less than the grayscale difference threshold, it means that the grayscale jump is small, and the probability of causing a ghosting problem is relatively low. Based on this, instead of converting the default grayscale voltage of each sub-pixel in the $n^{th}$ frame F(n) to the target grayscale voltage, step S40 can be directly performed.

In the embodiment of the disclosure, the timing controller may store a plurality of relationship tables of different numbers of grayscale bits. In specific implementation, converting the default grayscale voltage of the sub-pixel into the target grayscale voltage may include: determining a grayscale value of the target number of grayscale bits corresponding to each grayscale value of the default number of grayscale bits carried in the display data of the current frame, according to the pre-stored plurality of relationship tables of different numbers of grayscale bits; determining the target grayscale value from the grayscale values corresponding to the target number of grayscale bits; and taking the grayscale voltage corresponding to the target grayscale value of the target number of grayscale bits as the target grayscale voltage of the sub-pixel. Here, the target grayscale value is greater than the grayscale value of the target number of grayscale bits corresponding to the default grayscale voltage of the sub-pixel. For example, the difference between the target grayscale value and the grayscale value of the target number of grayscale bits corresponding to the default grayscale voltage of the sub-pixel is a set grayscale value.

In the embodiment of the disclosure, the timing controller stores a plurality of relationship tables, and the relationship tables include: correspondence relationships between grayscale values of different numbers of grayscale bits. For example, the timing controller stores: a relationship table shown in Table 1 (a correspondence relationship between 8-bit and 12-bit grayscale values), a relationship table shown in table 2 (a correspondence relationship between 10-bit and 12-bit grayscale values), and a relationship table shown in Table 3 (a correspondence relationship between 8-bit and 12-bit grayscale values). Of course, Tables 1 to 3 are only examples, and the timing controller can also store relationship tables corresponding to grayscale values of other numbers of grayscale bits, which are not limited here.

Combined with Table 1, for example, taking an 8-bit grayscale value of 2 as an example, the 8-bit grayscale value of 2 correspond to a 12-bit grayscale value of 8. That is, the voltage difference between the grayscale voltage corresponding to the 8-bit grayscale value of 2 and the voltage on the common electrode is the same as the voltage difference between the grayscale voltage corresponding to the 12-bit grayscale value of 8 and the voltage on the common electrode. For example, taking an 8-bit grayscale value of 255 as an example, the 8-bit grayscale value of 255 corresponds to a 12-bit grayscale value of 4066. That is, the voltage difference between the grayscale voltage corresponding to the 8-bit grayscale value of 255 and the voltage on the common electrode is the same as the voltage difference between the grayscale voltage corresponding to the 12-bit grayscale value of 4066 and the voltage on the common electrode. The rest are similar and will not be repeated here.

Tables 1-3 are as follows.

TABLE 1

| 8 bit | 12 bit |
|---|---|
| 0 | 0 |
| 1 | 2 |
| 2 | 8 |
| 3 | 15 |
| 4 | 20 |
| 5 | 27 |
| . . . | . . . |
| 252 | 4002 |
| 253 | 4017 |
| 254 | 4032 |
| 255 | 4066 |

TABLE 2

| 10 bit | 12 bit |
|---|---|
| 0 | 0 |
| 1 | 2 |
| 2 | 4 |
| 3 | 8 |
| 4 | 11 |
| 5 | 15 |
| . . . | . . . |
| 1020 | 4002 |
| 1021 | 4007 |
| 1022 | 4012 |
| 1023 | 4016 |

TABLE 3

| 8 bit | 10 bit |
|---|---|
| 0 | 0 |
| 1 | 2 |
| 2 | 4 |
| 3 | 8 |
| 4 | 11 |
| 5 | 15 |
| . . . | . . . |
| 252 | 1002 |
| 253 | 1007 |
| 254 | 1012 |
| 255 | 1016 |

Table 4 shows the correspondence relationship between 10-bit and 12-bit grayscale values in the prior art. Combined with Table 4, taking an 8-bit grayscale value of 1023 as an example, the 8-bit grayscale value of 1023 corresponds to a 12-bit grayscale value of 4096. That is, the voltage difference between the grayscale voltage corresponding to the 8-bit grayscale value of 1023 and the voltage on the common electrode is the same as the voltage difference between the grayscale voltage corresponding to the 12-bit grayscale value of 4096 and the voltage on the common electrode. The rest are similar and will not be repeated here.

TABLE 4

| 10 bit | 12 bit |
|---|---|
| 0 | 0 |
| 1 | 2 |
| 2 | 5 |
| 3 | 8 |
| 4 | 11 |
| 5 | 14 |
| . . . | . . . |
| 1020 | 4089 |
| 1021 | 4090 |
| 1022 | 4091 |
| 1023 | 4096 |

Figure 7:
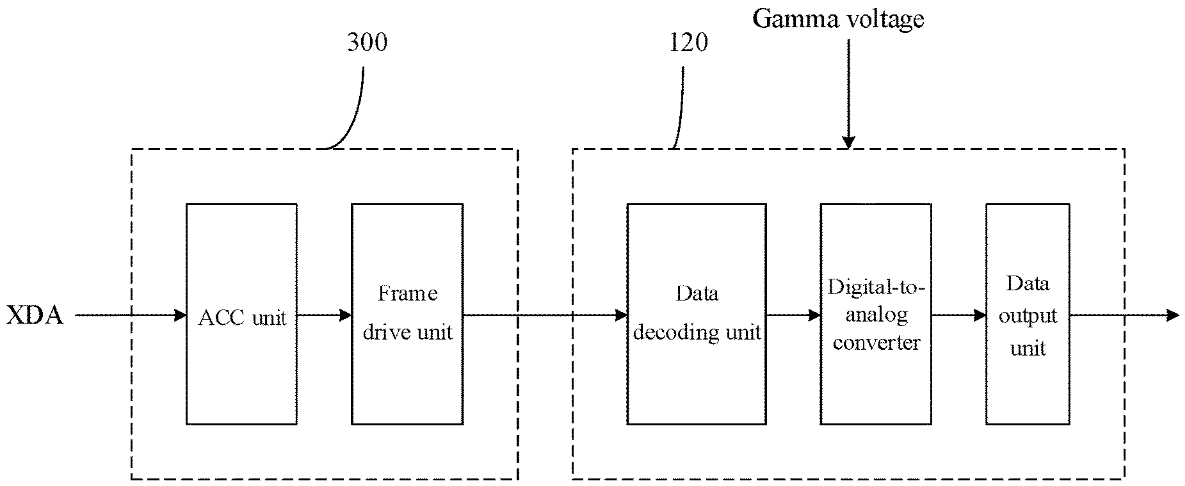
FIG. 7 is a schematic structural diagram showing a timing controller and a source drive circuit according to an embodiment of the disclosure.

In an embodiment of the disclosure, as shown in FIG. 7, the timing controller 300 may include an accurate color capture (ACC) unit and a frame drive unit. Here, the ACC unit can obtain the display data of the current frame and the display data of the previous frame; determine whether the display data of the current frame is the same as the display data of the previous frame; when it is determined that the display data of the current frame is different from the display data of the previous frame, for each sub-pixel, determine a grayscale difference between a grayscale value corresponding to a default grayscale voltage of the sub-pixel in the current frame and a grayscale value corresponding to a default grayscale voltage of the sub-pixel in the previous frame; and when the grayscale difference corresponding to at least one sub-pixel is not less than a grayscale difference threshold, determine a target number of grayscale bits to be converted. The frame drive unit can store a plurality of relationship tables of different numbers of grayscale bits; based on the default number of grayscale bits and the target number of grayscale bits, and a relationship table between the default number of grayscale bits and the target number of grayscale bits in the plurality of stored relationship tables, determine a grayscale value of the target number of grayscale bits corresponding to each grayscale value of the default number of grayscale bits carried in the display data of the current frame; and take a grayscale voltage corresponding to the target grayscale value of the target number of grayscale bits as the target grayscale voltage of the sub-pixel to output. The source drive circuit 120 may include a data decoding unit, a digital-to-analog converter, and a data output unit. Here, the data decoding unit can receive the target grayscale voltage output from the frame drive unit, decode the received target grayscale voltage, and output the decoded target grayscale voltage to the digital-to-analog converter. Since the decoded target grayscale voltage is a digital signal, the digital-to-analog converter converts the target grayscale voltage of the digital signal into the gamma voltage of the analog signal and outputs the converted gamma voltage to the data output unit. The data output unit receives the converted gamma voltage and transmits the gamma voltage to the data lines in the display panel according to the interface protocol to charge the sub-pixels.

Further, when it is determined that the display data of the current frame is the same as the display data of the previous frame, the default grayscale voltage of the display data of the current frame is directly output to the source drive circuit. The data decoding unit can receive the default grayscale voltage, decode the received default grayscale voltage, and then output the decoded default grayscale voltage to the digital-to-analog converter. Since the decoded default grayscale voltage is a digital signal, the digital-to-analog converter converts the default grayscale voltage of the digital signal into the gamma voltage of the analog signal and outputs the converted gamma voltage to the data output unit. The data output unit receives the converted gamma voltage and transmits the gamma voltage to the data lines in the display panel according to the interface protocol to charge the sub-pixels.

Figure 4B:
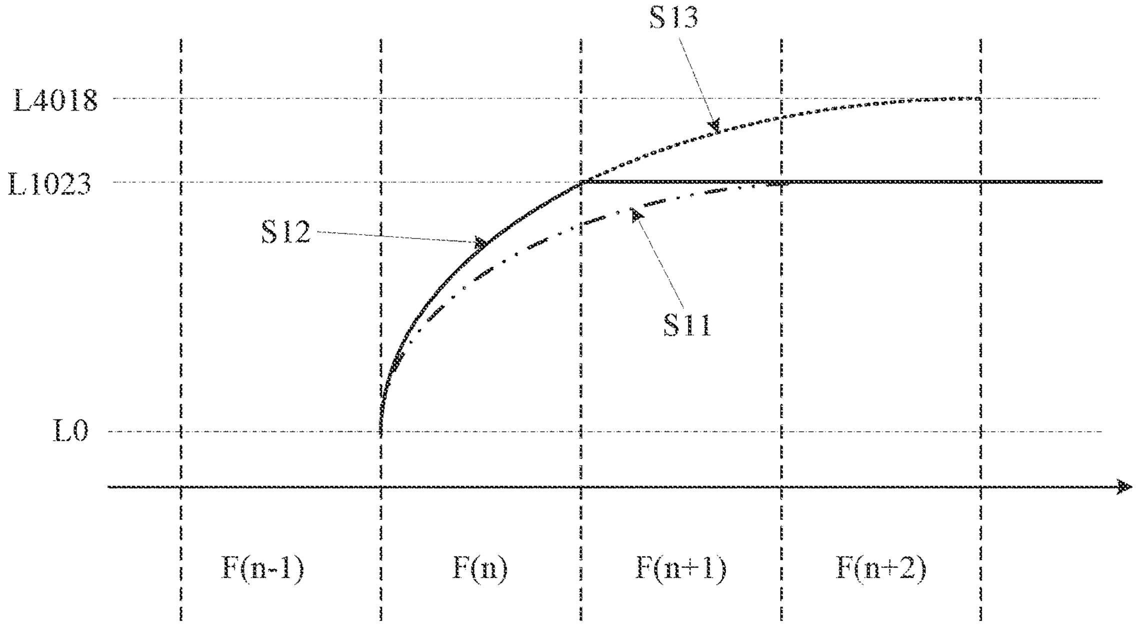
FIG. 4B is a schematic diagram illustrating voltages input for a sub-pixel in different display frames according to an embodiment of the disclosure.

The driving method in the embodiment of the disclosure will be described below with reference to FIG. 4A and FIG. 4B, taking the $(n-1)^{th}$ frame F(n−1) to the $(n+2)^{th}$ frame F(n+2) as an example. It should be noted that this embodiment is used to better explain the disclosure, but does not limit the disclosure. In FIG. 4A and FIG. 4B, LO indicates the grayscale value of 0, L1023 indicates the positive grayscale value of 1023, and L4018 indicates the positive grayscale value of 4018. S21 indicates a transition curve of grayscales in the embodiment of the disclosure. S11 indicates an actual voltage curve charged for the sub-pixel when the grayscale voltage corresponding to the grayscale of L1023 is input to the sub-pixel in the display panel in the prior art. S12 (solid line) indicates an actual voltage curve charged for the sub-pixel when the grayscale voltage corresponding to the grayscale of L4018 is input to the sub-pixel in the display panel in the embodiment of the disclosure. S13 indicates a trend curve of the voltage charged for the sub-pixel when the grayscale voltage corresponding to the grayscale of L4018 is input to the sub-pixel in the display panel in the embodiment of the disclosure.

The following takes positive grayscale values as an example. The same applies to negative grayscale values, which will not be described in detail here.

The default number of grayscale bits being 10-bit and the target number of grayscale bits being 12-bit are taken as an example.

When the image of the $n^{th}$ frame F(n) will be displayed, the $n^{th}$ frame F(n) can be used as the current frame, and the $(n-1)^{th}$ frame F(n−1) can be used as the previous frame, so that the display data of the $n^{th}$ frame F(n) and the display data of the $(n-1)^{th}$ frame F(n−1) can be obtained.

For a same sub-pixel, the display data of the sub-pixel in the $n^{th}$ frame F(n) is compared with the display data of the sub-pixel in the $(n-1)^{th}$ frame F(n−1), until the display data of all sub-pixels have been compared. If for sub-pixels, the display data of the $n^{th}$ frame F(n) and the display data of the $(n-1)^{th}$ frame F(n−1) corresponding to some sub-pixels are same, and the display data of the $n^{th}$ frame F(n) and the display data of the $(n-1)^{th}$ frame F(n−1) corresponding to the remaining sub-pixels are different; or the display data of the $n^{th}$ frame F(n) and the display data of the $(n-1)^{th}$ frame F(n−1) corresponding to all sub-pixels are different, it means that the image to be displayed in the $n^{th}$ frame F(n) is different from the image that has been displayed in the $(n-1)^{th}$ frame F(n−1). In other words, the images displayed in the $n^{th}$ frame F(n) and the $(n-1)^{th}$ frame F(n−1) are changed, that is, dynamic images are displayed. In this case, the grayscales corresponding to the remaining sub-pixels are changed.

According to the display data of the $n^{th}$ frame F(n), the default grayscale voltage corresponding to each sub-pixel in the $n^{th}$ frame F(n) and the grayscale value corresponding to the default grayscale voltage are obtained. Further, according to the display data of the $(n-1)^{th}$ frame F(n−1), the default grayscale voltage corresponding to each sub-pixel in the $(n-1)^{th}$ frame F(n−1) and the grayscale value corresponding to the default grayscale voltage are obtained. Taking a sub-pixel as an example, a grayscale difference between the grayscale value of the sub-pixel corresponding to the $n^{th}$ frame F(n) and the grayscale value of the sub-pixel corresponding to the $(n+1)^{th}$ frame F(n+1) is obtained. Grayscale differences of other sub-pixels can be obtained in a similar manner, which will not be described in detail here.

After determining the grayscale difference corresponding to each sub-pixel, these grayscale differences can be compared with the grayscale difference threshold. If there is a grayscale difference corresponding to a sub-pixel that is not less than the grayscale difference threshold, it means that the grayscale jump is large and there may be a ghosting problem. Based on this, based on the display data of the $n^{th}$ frame F(n), it can be determined that the default number of grayscale bits of the $n^{th}$ frame F(n) is 10 bits, and the target number of grayscale bits to be converted to is 12 bits. In this way, the 12-bit grayscale value corresponding to each 10-bit grayscale value can be determined based on the stored relationship table 2. It should be noted that, taking a 10-bit grayscale value of 2 as an example, the 10-bit grayscale value of 2 corresponds to a 12-bit grayscale value of 4. That is, the voltage difference between the grayscale voltage corresponding to the 10-bit grayscale value of 2 and the voltage on the common electrode is the same as the voltage difference between the grayscale voltage corresponding to the 12-bit grayscale value of 4 and the voltage on the common electrode. Taking a 10-bit grayscale value of 1023 as an example, the 10-bit grayscale value of 1023 corresponds to a 12-bit grayscale value of 4016. That is, the voltage difference between the grayscale voltage corresponding to the 10-bit grayscale value of 1023 and the voltage on the common electrode is the same as the voltage difference between the grayscale voltage corresponding to the 12-bit grayscale value of 4016 and the voltage on the common electrode. That is, in the embodiments of the disclosure, if the grayscale voltage corresponding to the grayscale value of 4016 in Table 2 is input to the sub-pixels in the display panel at this time, the brightness of the display panel can be the same as the brightness of the display panel when the grayscale voltage corresponding to the grayscale value of 4096 is input to the sub-pixels of the display panel in the prior art.

Considering that the target grayscale value is greater than the grayscale value in of target number of grayscale bits corresponding to the default grayscale voltage of the sub-pixel, and there is a set grayscale value between the target grayscale value and the grayscale value of the target number of grayscale bits corresponding to the default grayscale voltage of the sub-pixel, the target grayscale value can be determined from the grayscale values corresponding to the target number of grayscale bits. For example, the set grayscale value is 2. Taking a 10-bit grayscale value of 1023 as an example, the 10-bit grayscale value of 1023 corresponds to a 12-bit grayscale value of 4016. The remaining grayscale values greater than 4016 among the 12-bit grayscale values can be used as alternative target grayscale values. Due to the need for a difference of 2 between the target grayscale value and 4016, a 12-bit grayscale value of 4018 can be used as the target grayscale value. Alternatively, the set grayscale value is 1. Taking a 10-bit grayscale value of 1023 as an example, the 10-bit grayscale value of 1023 corresponds to a 12-bit grayscale value of 4016. The remaining grayscale values greater than 4016 among the 12-bit grayscale values can be used as alternative target grayscale values. Due to the need for a difference of 1 between the target grayscale value and 4016, a 12-bit grayscale value of 4017 can be used as the target grayscale value. Of course, in actual applications, the set grayscale value can be determined according to the needs of the actual application, and is not limited here.

The grayscale voltage corresponding to the target grayscale value of the target number of grayscale bits is taken as the target grayscale voltage of the sub-pixel. Thus, the target grayscale voltage that will be input into each sub-pixel in the $n^{th}$ frame F(n) can be obtained. The target grayscale voltage that will be input into each sub-pixel in the $n^{th}$ frame F(n) is sequentially decoded and digital-to-analog converted to obtain the gamma voltage. The gamma voltage is transmitted to the data lines in the display panel according to the interface protocol to charge sub-pixels.

When the image of the $(n+1)^{th}$ frame F(n+1) is to be displayed, for the same sub-pixel, the display data of the sub-pixel in the $(n+1)^{th}$ frame F(n+1) and the display data of the sub-pixel in the $n^{th}$ frame F(n) can be compared, until the display data of all sub-pixels have been compared. If for each sub-pixel, the display data of the $n^{th}$ frame F(n) and the display data of the $(n+1)^{th}$ frame F(n+1) corresponding to the same sub-pixel are the same, then it means that the image to be displayed in the $n^{th}$ frame F(n) is the same as the image already displayed in the $(n+1)^{th}$ frame F(n+1). That is, the images displayed in the $n^{th}$ frame F(n) and the $(n+1)^{th}$ frame F(n+1) are not changed, meaning that the image displayed is a static image. In this case, the grayscale of the sub-pixel does not change, so there is no need to convert the grayscale voltage corresponding to the number of grayscale bits. Then the display panel can be driven to display directly based on the default grayscale voltage of the display data of the current frame. For example, the grayscale voltage corresponding to a 10-bit grayscale value of 1023 is input.

When the image of the $(n+2)^{th}$ frame F(n+2) is to be displayed, for the same sub-pixel, the display data of the sub-pixel in the $(n+2)^{th}$ frame F(n+2) and the display data of the sub-pixel in the $(n+1)^{th}$ frame F(n+1) can be compared, until the display data of all sub-pixels have been compared. If for each sub-pixel, the display data in the $(n+1)^{th}$ frame F(n+1) and the display data in the $(n+2)^{th}$ frame F(n+2) corresponding to the same sub-pixel are the same, then it means that the image to be displayed in the $(n+2)^{th}$ frame F(n+2) is the same as the image already displayed in the $(n+1)^{th}$ frame F(n+1). That is, the images displayed in the $(n+1)^{th}$ frame F(n+1) and the $(n+2)^{th}$ frame F(n+2) are not changed, meaning that the image displayed is a static image. In this case, the corresponding grayscale of the sub-pixel does not change, so there is no need to convert the grayscale voltage corresponding to the number of grayscale bits. Then the display panel can be driven to display directly based on the default grayscale voltage of the display data of the current frame. For example, the grayscale voltage corresponding to a 10-bit grayscale value of 1023 is input.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of combination of software and hardware. Furthermore the disclosure can be embodied in the form of a computer program product embodied in one or more computer useable storage mediums (including but not limited to a disk memory, a compact disc read-only memory (CD-ROM), an optical memory, etc.) in which computer useable program codes are contained.

The disclosure has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of other programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art will be able to make additional changes and modifications to these embodiments once the basic inventive concepts are obtained. Therefore, it is intended that the appended claims be construed to include the preferred embodiments and all changes and modifications that fall within the scope of this disclosure.

Obviously, those skilled in the art can make various changes and modifications to the disclosed embodiments without departing from the spirit and scope of the disclosed embodiments. In this way, if these modifications and variations of the embodiments of the disclosure fall within the scope of the claims of the disclosure and equivalent technologies, the disclosure is also intended to include these modifications and variations.

What is claimed is:

1. A driving method for a display panel, comprising:

obtaining display data of a current frame and display data of a previous frame;

determining whether the display data of the current frame and the display data of the previous frame are same; and in response to the display data of the current frame and the display data of the previous frame being not same, driving the display panel to display after converting a default grayscale voltage corresponding to at least one sub-pixel among default grayscale voltages of a default number of grayscale bits carried in the display data of the current frame into a target grayscale voltage of a target number of grayscale bits;

wherein:

for a same sub-pixel, there is a default voltage difference between a default grayscale voltage corresponding to the sub-pixel and a voltage on a common electrode, and there is a target voltage difference between a target grayscale voltage corresponding to the sub-pixel and the voltage on the common electrode, wherein the target voltage difference is greater than the default voltage difference; and there is a target grayscale voltage difference between a target grayscale voltage corresponding to a maximum positive grayscale value of the target number of grayscale bits and a target grayscale voltage corresponding to a maximum negative grayscale value of the target number of grayscale bits, and there is a default grayscale voltage difference between a default grayscale voltage corresponding to a maximum positive grayscale value of the default number of grayscale bits and a default grayscale voltage corresponding to a maximum negative grayscale value of the default number of grayscale bits, wherein the target grayscale voltage difference is greater than the default grayscale voltage difference.

2. The driving method for the display panel according to claim 1, wherein the target number of grayscale bits is greater than the default number of grayscale bits.

3. The driving method for the display panel according to claim 2, wherein the default grayscale voltage corresponding to the maximum negative grayscale value is taken as the target grayscale voltage corresponding to the maximum negative grayscale value, and the default grayscale voltage corresponding to the maximum positive grayscale value plus a set compensation voltage is the target grayscale voltage corresponding to the maximum positive grayscale value.

4. The driving method for the display panel according to claim 3, wherein the target grayscale voltage corresponding to the maximum positive grayscale value is 17.5V~20V.

5. The driving method for the display panel according to claim 3, wherein a method of determining the compensation voltage comprises:

increasing a grayscale voltage of a set display panel corresponding to the maximum positive grayscale voltage in a current adjustment, based on an initial grayscale voltage corresponding to the maximum positive grayscale value and an initial grayscale voltage corresponding to the maximum negative grayscale value, and according to a set step voltage value;

determining a common voltage of the set display panel according to the initial grayscale voltage corresponding to the maximum negative grayscale value and a grayscale voltage corresponding to the maximum positive grayscale value after increasing;

driving the set display panel to display according to the determined common voltage and the grayscale voltage corresponding to the maximum positive grayscale value after increasing;

collecting a common voltage difference between a pixel electrode and the common electrode in the sub-pixel of the set display panel;

determining whether the common voltage difference is within a set common voltage value range;

in response to the common voltage difference being within the set common voltage value range, determining a difference between the grayscale voltage corresponding to the maximum positive grayscale value after increasing and the initial grayscale voltage corresponding to the maximum positive grayscale value as the compensation voltage; and in response to the common voltage difference being not within the set common voltage value range, entering a next adjustment.

6. The driving method for the display panel according to claim 1, wherein the driving of the display panel to display, after converting a default grayscale voltage corresponding to at least one sub-pixel among default grayscale voltages of a default number of grayscale bits carried in the display data of the current frame into a target grayscale voltage of a target number of grayscale bits, comprises:

for each sub-pixel, determining a grayscale difference between a grayscale value corresponding to the default grayscale voltage of the sub-pixel in the current frame and a grayscale value corresponding to a default grayscale voltage of the sub-pixel in the previous frame; and in response to the grayscale difference corresponding to at least one sub-pixel being not less than a grayscale difference threshold, driving the display panel to display after converting the default grayscale voltage of the sub-pixel into the target grayscale voltage.

7. The driving method for the display panel according to claim 6, wherein the converting of the default grayscale voltage of the sub-pixel into the target grayscale voltage comprises:

determining a grayscale value of the target number of grayscale bits corresponding to each grayscale value of the default number of grayscale bits carried in the display data of the current frame, according to the default number of grayscale bits, the target number of grayscale bits, and a plurality of pre-stored relationship tables of different numbers of grayscale bits; wherein, the relationship tables comprise: correspondence relationships between grayscale values of different number of grayscale bits;

determining a target grayscale value from grayscale values corresponding to the target number of grayscale bits; wherein the target grayscale value is greater than the grayscale value of the target number of grayscale bits corresponding to the default grayscale voltage of the sub-pixel; and taking a grayscale voltage corresponding to the target grayscale value of the target number of grayscale bits as the target grayscale voltage of the sub-pixel.

8. The driving method for the display panel according to claim 7, wherein there is a set grayscale value between the target grayscale value and the grayscale value of the target number of grayscale bits corresponding to the default grayscale voltage of the sub-pixel.

9. A display apparatus, comprising:

a timing controller configured to obtain display data of a current frame and display data of a previous frame; determine whether the display data of the current frame and the display data of the previous frame are same; and in response to the display data of the current frame and the display data of the previous frame being not same, convert a default grayscale voltage corresponding to at least one sub-pixel among default grayscale voltages of a default number of grayscale bits carried in the display data of the current frame into a target grayscale voltage of a target number of grayscale bits; and a source drive circuit configured to receive the target grayscale voltage output from the timing controller, and drive the display panel to display according to the received target grayscale voltage;

wherein:

for a same sub-pixel, there is a default voltage difference between a default grayscale voltage corresponding to the sub-pixel and a voltage on a common electrode, and there is a target voltage difference between a target grayscale voltage corresponding to the sub-pixel and the voltage on the common electrode, wherein the target voltage difference is greater than the default voltage difference; and there is a target grayscale voltage difference between a target grayscale voltage corresponding to a maximum positive grayscale value of the target number of grayscale bits and a target grayscale voltage corresponding to a maximum negative grayscale value of the target number of grayscale bits, and there is a default grayscale voltage difference between a default grayscale voltage corresponding to a maximum positive grayscale value of the default number of grayscale bits and a default grayscale voltage corresponding to a maximum negative grayscale value of the default number of grayscale bits, wherein the target grayscale voltage difference is greater than the default grayscale voltage difference.

10. The display apparatus according to claim 9, wherein the timing controller is further configured to:

for each sub-pixel, determine a grayscale difference between a grayscale value corresponding to the default grayscale voltage of the sub-pixel in the current frame and a grayscale value corresponding to a default grayscale voltage of the sub-pixel in the previous frame; and in response to the grayscale difference corresponding to at least one sub-pixel being not less than a grayscale difference threshold, drive the display panel to display after converting the default grayscale voltage of the sub-pixel into the target grayscale voltage.

11. The display apparatus according to claim 10, wherein the timing controller stores a plurality of relationship tables of different numbers of grayscale bits.

* * * * *